United States Patent [19]

Gillis

[11] Patent Number: 5,484,829
[45] Date of Patent: Jan. 16, 1996

[54] ISOCYANATE REACTIVE BLENDS AND INTERNAL MOULD RELEASE COMPOSITIONS

[75] Inventor: Herbert R. Gillis, Sterling Heights, Mich.

[73] Assignee: Imperial Chemical Industries, PLC, London, England

[21] Appl. No.: 320,655

[22] Filed: Oct. 11, 1994

Related U.S. Application Data

[62] Division of Ser. No. 117,641, Sep. 8, 1993, Pat. No. 5,384,351, which is a continuation of Ser. No. 760,191, Sep. 16, 1991, abandoned.

[30] Foreign Application Priority Data

Oct. 3, 1990 [GB] United Kingdom ............ 9021524

[51] Int. Cl.$^6$ ............... C08K 5/04; C08K 5/34; C10M 105/08
[52] U.S. Cl. ............. 524/92; 524/399; 524/588; 524/783; 524/864; 252/35
[58] Field of Search .............. 252/35; 524/92, 524/399, 783, 864, 588

[56] References Cited

U.S. PATENT DOCUMENTS

| 4,477,366 | 10/1984 | Robertson | 528/48 |
|---|---|---|---|
| 4,498,929 | 2/1985 | Robertson | 528/28 |
| 4,546,154 | 10/1985 | Robertson | 528/28 |
| 4,585,803 | 4/1986 | Nelson et al. | 524/724 |
| 4,764,330 | 8/1988 | Stuber et al. | 528/38 |
| 4,876,019 | 10/1989 | Meyer et al. | 528/51 |

Primary Examiner—Melvyn I. Marquis
Assistant Examiner—Karen A. Dean
Attorney, Agent, or Firm—Cushman Darby & Cushman

[57] ABSTRACT

Internal mould release compositions suitable for use in the production of moulded articles by the RIM process, comprises a blend of a metal salt of an organic acid and a polysiloxane polymer having isocyanate reactive organic groups and optionally a compatibilizing amount of an amidine or imidate compound.

6 Claims, No Drawings

ISOCYANATE REACTIVE BLENDS AND INTERNAL MOULD RELEASE COMPOSITIONS

This is a division of application No. 08/117,641, filed Sep. 8, 1993, now U.S. Pat. No. 5,384,351 which is a continuation of application No. 07/760,191, filed Sep. 16, 1991, now abandoned.

BACKGROUND OF THE INVENTION

1. Field of the Invention

This invention relates to internal mould release compositions and to their use in the production of moulded articles by the reaction injection moulding process from reaction mixtures containing organic polyisocyanates and isocyanate-reactive components. In particular, it is directed to blends of organic metal salts and polysiloxane derivatives having pendant hydroxy functional organic groups and/or other isocyanate reactive groups.

2. Description of Related Art

The production of moulded articles, for example automotive body parts, from organic polyisocyanates and isocyanate-reactive components by the reaction injection moulding (RIM) process is well established. In the process, two highly reactive liquid streams, one containing a polyisocyanate and the other containing isocyanate-reactive components, for example polyol and/or polyamine reactants, are impingement mixed and rapidly injected into a mould cavity. By this method, high production rates of moulded polyurethane, polyurea and related polymeric articles having excellent physical properties can be achieved.

Whilst the RIM process is eminently suited to the mass production of isocyanate-based moulded articles, it is essential to its successful and economic operation that the moulded product can be easily removed from the mould without being damaged. One method of facilitating demoulding is to coat the internal surfaces of the mould with a mould release agent, for example a wax or soap. This procedure has the disadvantage that application of the release agent has to be repeated almost every time the mould is used, adding substantially to the time and cost of the process.

In order to overcome the problems associated with external mould release agents, it has been proposed to use release agents of the internal type pre-blended with either the polyisocyanate or the isocyanate-reactive component. One type of internal release agent which has been successfully used in the production of other moulded plastics articles comprises metal carboxylates such as zinc stearate.

Unfortunately, such salts are soluble in neither the polyisocyanate nor with most of the usual isocyanate-reactive components. It has been proposed, therefore, to use the metal salts in conjunction with certain materials which have the effect of compatibilising the salts with the isocyanate-reactive compounds: U.S. Pat. Nos. 4,876,019; 4,519,965; 4,581,386; 4,585,803. Furthermore, U.S. Pat. Nos. 4,477,366; 4,498,929; 4,504,313 and 4,546,154 propose the use of polysiloxane polymers having isocyanate reactive functional groups as internal mould release agents.

SUMMARY OF THE INVENTION

It has now been found that a superior mould release effect can be obtained for metal salts of organic acids used in conjunction with isocyanatereactive compounds when combined with polysiloxane polymers, in the manufacture of polyurethane, polyurea and like polymers by processes such as the RIM process.

DETAILED DESCRIPTION OF THE INVENTION

The invention provides an internal mould release composition comprising:
 (a) a metal salt of an organic acid having 10–24 carbon atoms, said metal being selected from Groups I and II of the Periodic Table and chromium, molybdenum, iron, cobalt, nickel, aluminum, tin, lead, bismuth, antimony, and zinc and
 (b) a polysiloxane polymer having isocyanate reactive organic groups.

Metal salt and polysiloxane blends are improved in miscibility by mixing therewith compatibilizing amounts of an amidine or imidate compound of formula (1):

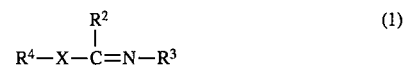

wherein X represents O, S or $NR^1$ and wherein each of $R^1$ to $R^4$ represents H, or independently or together, an organic radical, selected from
 a) alkyl radicals, preferably of 1 to 25 C atoms, more preferably 1 to 6 C atoms;
 b) cycloalkyl radicals, preferably of 5 to 25 C atoms, more preferably of 5 to 7 C atoms;
 c) aralkyl and/or aryl radicals, preferably of 6 to 18 C atoms and preferably substituted with electron donating substituents such as hydroxy, alkoxy or N,N-dialkylamino, such as benzyl, phenyl and phenylethyl;
 d) polymeric chains containing hetero atoms (such as O, N or S) which may be selected from polyether chains, polyester chains, polyacetals and polycarbonates. Aliphatic radicals are preferred.

It is noted that in the above formula any two of the three substituents attached to the imino-unit can be joined together to form at least one non-aromatic ring, preferably a 5, 6 or 7 membered ring. Such structures are formed by joining $R^2$ with $R^3$ or $R^4$ and when X is $NR^1$, $R^1$ with $R^2$, $R^3$ or $R^4$ to form compounds having one or more rings.

Optionally, each of $R^1$ to $R^4$ when not H, may be further substituted with additional amidine or imidate residues or groups.

Preferred amidine and imidate ester compounds for use in the compositions of the invention contain from 1 to 4 such amidine or imidate group(s).

It is preferred that the amidine and imidate compounds have molecular weights not greater than 1500, preferably in the range 60 to 600, for example 100 to 600. The term "compatibiliser", as used herein, refers to an additive or reagent used to promote the formation of a dispersion, colloidal suspension, and/or solution of the metal salt (having internal mould release properties) in an isocyanate-reactive material and/or any blend comprising two or more isocyanate-reactive materials which are normally immiscible. Said suspension, solution, or dispersion having improved stability against separation.

The compatibilizing agents of the invention have the advantage of improved stability (to separation of the metallic salt internal mold release agent) and better control over reactivity (i.e. flow, gel time) of the isocyanate reactive ingredients.

The expression "a compatibilizing amount" used herein means an amount of the amidine and imidate ester compound which is sufficient to provide improved stability to separation in a solution or dispersion of mould release composition in an isocyanate-reactive compound or compounds; and/or improved stability to separation in a mixture comprising otherwise immiscible ingredients. Clearly, this amount will vary depending on the nature of the metal salt, the nature of the isocyanate-reactive compounds and their relative proportions as well as on the specific structure of the amidine and imidate compounds. In many instances the amount required is less than 1% based on the total weight of the isocyanate reactive ingredients. The metal salts present in the compositions of the invention may be any metal salts which are derived from organic acids and which have mould release properties. Such salts have been fully described in the prior art relating to the moulding of polyurethanes, polyureas and other resins.

The organic acids from which the salts may be derived particularly include carboxylic acids containing from 8 to 24 carbon atoms. Such acids may be aromatic or cycloaliphatic but are preferably aliphatic monocarboxylic acids which may be straight-chain or branched, saturated or unsaturated and may carry substituents such as hydroxy, amino, imino, enamino, or amido groups. The most preferred aliphatic monocarboxylic acids are the so-called "fatty acids" having from 10 to 24 carbon atoms, for example lauric, palmitic, stearic, isostearic, oleic, linoleic and ricinoleic acids and mixtures of any of these.

The metal salts may be salts of any metal of Groups Ia, Ib, IIa and IIb of the Periodic Table or of other metals such as chromium, molybdenum, iron, cobalt, nickel, aluminium, tin, lead, antimony or bismuth. The preferred metals are lithium, magnesium, calcium, barium, iron, cobalt, nickel, copper, zinc, cadmium and aluminium and mixtures thereof.

As examples of particularly suitable salts there may be mentioned zinc stearate, zinc oleate, zinc palmitate, zinc laurate, zinc octoate, zinc behenate, zinc ricinoleate and the calcium, magnesium, nickel and copper salts of lauric, palmitic, stearic and oleic acids. The most preferred salt is zinc stearate.

The blends of this invention can be made by forming an above described metal salt dispersion in one or more polysiloxane mold release agent, said polysiloxane consists essentially of 0.5–20 mol % of $R_aR'_bSiO_{[4-(a+b)]/2}$ units and from 99.5–80 mol % of $R''_cSiO_{(4-c)/2}$ units where R is an isocyanate reactive organic radical,
(a) has an average value of from 1–3, R' and R" are non-isocyanate reactive hydrocarbon radicals or non-isocyanate reactive substituted organic radicals,
(b) has an average value of 0–2, a+ b is from 1–3,
(c) has an average value from 1 to 3, and wherein
(d) the ratio of the total molecular weight of said polysiloxane polymer to the total number of isocyanate reactive functional groups in the polysiloxane polymer (equivalent weight) ranges from 100–3500.
(e) the combined formula weights of all isocyanate reactive organic radicals, R do not exceed 40% of the total molecular weight of the polysiloxane polymer;
(f) the combined formula weights of all non-isocyanate reactive radicals, R'+R" together do not exceed 40% of the total molecular weight of the polysiloxane polymer;
(g) the combined formula weights of all the organic radicals R+R'+R" in the polysiloxane polymer together do not exceed 60% of the total molecular weight of the polysiloxane polymer;
(h) the polysiloxane polymer(s) each contain an average of at least two isocyanate reactive functional groups per molecule;
(i) at least two of the isocyanate reactive functional groups in each molecule are located on separate organic radicals, R, attached independently to different silicon atoms in the polysiloxane molecule;
(j) Examples of the isocyanate reactive functional groups which may be employed in the polysiloxane molecule(s) may be of the following types:
(1) alcohols, (2) phenols, (3) thiols, (4) primary or secondary aromatic amines, which contain no oxygen, and have not more than one nitrogen atom attached directly to, in conjugation with, or incorporated within, the aromatic ring nucleus, (5) secondary aliphatic amines wherein at least one of the alkyl carbon atoms, bonded directly to the nitrogen atom, is not a primary carbon atom, (6) carboxylic acids.

Other reactive functional groups which may be used include primary aliphatic amines; imines; enamines; and/or ketene aminals. Preferably, the isocyanate functional groups are selected from the group consisting of alcohols, phenols, thiols, primary and secondary amines, imines, enamines and ketene aminals. The groups may be used independently or in any combination which is consistent with conditions a-f;
(k) the molecular weight of the polysiloxane mold release agent is between 1000 and 30,000, preferably 2000–15,000 and most preferably 4000–8000.
(l) the polysiloxane mold release agent is substantially insoluble in liquid polyisocyanates especially those named below.

In these mold release agents the isocyanate reactive organic R radicals having preferably a molecular weight in the range of 100–400 can be attached to silicon atoms directly through carbon or through oxygen, nitrogen or sulfur carbon bonds. However, attachment through silicon carbon bonds is preferred. Particularly preferred R radicals are those of the formula HO-R''', $H_2$N-R''', $HNR_2'''$,

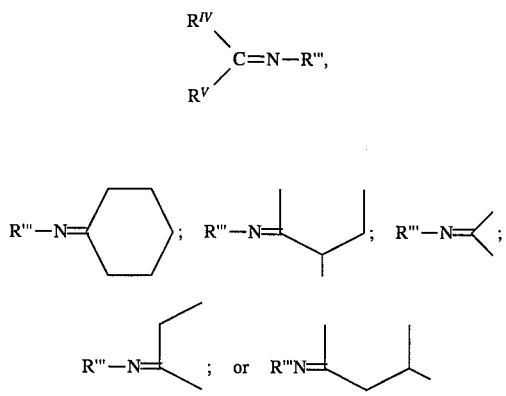

wherein R''' is a divalent linking group composed of carbon and hydrogen; carbon, hydrogen and oxygen; carbon, hydrogen and sulfur; carbon, hydrogen and nitrogen; or carbon, hydrogen, oxygen and nitrogen. Specific examples of R''' include methylene, ethylene, propylene, hexamethylene, decamethylene, $CH_2CH(CH_3)$—$CH_2$—, phenylene, butyl phenylene, naphthylene, —$CH_2CH_2SCH_2CH_2$—, —$CH_2CH_2OCH_2$—, —$CH_2CH_2$—$CH_2$—O($CH_2$—CHR'O)$_n$—, where n is 0–5 and where R' is described as above or H, a preferred R group is —CH$_2$CH$_2$CH$_2$O[CH$_2$CH(CH$_3$)O]$_n$H where n=1–5. It is preferred that the R''' linking group contains from 3–10 atoms in addition to hydrogen atoms. There can be from 1–33 functional R radicals, preferably 3–10, and from 1–3 attached to a silicon atom. Groups R$^{IV}$ and R$^V$ are preferably alkyl or cycloalkyl groups of one to ten carbon atoms. As indicated above, the R' radical can be any hydrocarbon or substituted organic radical. Illustrative of the R' radicals that can be present are alkyl radicals such as the methyl, ethyl, propyl, butyl amyl, hexyl, octyl, decyl, dodecyl, octadecyl, and myricyl ,radicals; alkenyl radicals such as the vinyl, allyl, and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, alpha,alpha,alpha-trifluorotolyl and the dichloroxenyl radicals; the corresponding cyanohydrocarbon radicals such as 2-cyanoethyl, 3-cyanopropyl and cyanophenyl radicals; the corresponding radicals such as ether and ester hydrocarbon radicals such as —(CH$_2$)$_3$OC$_2$H$_5$, —(CH$_2$)$_3$OCH$_3$, —(CH$_2$)$_3$COOC$_2$H$_5$, and —(CH$_2$)$_3$COOCH$_3$, the corresponding thioether and thioester hydrocarbon radicals such as —(CH$_2$)$_3$SC$_2$H$_5$ and —(CH$_2$)$_3$COSCH$_3$; and nitrohydrocarbon radicals such as the nitrophenyl and 3-nitro-propyl radicals. It is preferred that the R' radical be an organic radical containing from 1 to 10 atoms. In the most preferred embodiment of this invention at least 90 percent of all the R' radicals are methyl radicals. There can be an average of from 0 to 2 R' radicals attached to the silicon atom, i.e., (b) has an average of from 0 to 2 in the above formula. The R'' radical in the functional isocyanate reactive siloxanes of this invention can also be any hydrocarbon radical. The illustrative examples given with respect to R' above are equally applicable here and are not repeated for the sake of brevity. Likewise, the preferences set forth for R' above also apply to the R'' radical. There can be from 0 to 3 R'' radicals, on the average, per silicon atom, i.e., (c) has an average value of from 1 to 3 in the above formula.

These polysiloxane mold release agents are made by well known techniques and are usually formed by grafting an olefin containing organic modifying group or polyoxyalkylene oxide onto a "methylhydrogen siloxane" modified polydimethylsiloxane using a platinum catalyzed hydrolisation reaction.

The functional siloxanes of the mold release agent can be either solid or liquid in form and are required to be substantially insoluble in isocyanate liquid under RIM operating conditions. In order to use a solid functional siloxane it would be necessary to dissolve, disperse or suspend the siloxane. Hence it is much preferred that the functional siloxane employed be in liquid form. While the viscosity of the liquid siloxane can vary over a wide range, for example from 1–100,000 cs (centistokes) it is generally preferred that the viscosity be in the range of from 50–1000 cs. Molecular weight can vary from 1000 to 30,000, preferably 2000–20,000 and most preferably 4000–8000. The polysiloxane formulations of the invention include polysiloxanes such as those included in the above described definition and specifically but not limited to those in the following list having R$_a$R'$_b$SiO$_{[4-(a+b)]/2}$ units and R''SiO$_{[4-c]/2}$ units and wherein the value listed for (d) is the equivalent weight, (e) is the combined formula weights or reactive radicals R expressed as percent of the molecular weight, and (f) is the combined formula weights of non-isocyanate reactive groups R'+R'' expressed as percent of the molecular weight:

"Polysiloxane I" is a hydroxy functional polysiloxane polyether copolymer internal mold release agent having the approximate formula:

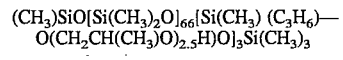
(CH$_3$)SiO[Si(CH$_3$)$_2$O]$_{66}$[Si(CH$_3$) (C$_3$H$_6$)—O(CH$_2$CH(CH$_3$)O)$_{2.5}$H)O]$_3$Si(CH$_3$)$_3$ having a molecular weight of about 6000, a hydroxy equivalent weight (d) of 2000, (e) is 13%, (f) is 35%, and a viscosity of 160 centistokes.

"Polysiloxane II" is a hydroxy functional thioether copolymer internal mold release agent having the general formula:

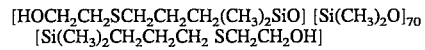
[HOCH$_2$CH$_2$SCH$_2$CH$_2$CH$_2$(CH$_3$)$_2$SiO] [Si(CH$_3$)$_2$O]$_{70}$[Si(CH$_3$)$_2$CH$_2$CH$_2$CH$_2$ SCH$_2$CH$_2$OH]

having a hydroxy equivalent weight (d) of 2750, a molecular weight of 5500, a value for (e) of 4.7%, (f) is 37% and a viscosity of about 55 centistokes.

"Polysiloxane III" has a general formula as follows:

(CH$_3$)$_3$SiO[Si(CH$_3$)$_2$O]$_{134}$[ Si(CH$_3$)(C$_3$H$_6$OC$_2$H$_3$—(OH)CH$_2$OH)O] $_{16}$Si(CH$_3$)$_3$ a molecular weight 13,136, (d) equivalent weight of 411, (e) is 16% and (f) is 33%.

"Polysiloxane IV" has a general formula as follows:

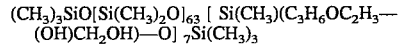
(CH$_3$)$_3$SiO[Si(CH$_3$)$_2$O]$_{63}$ [ Si(CH$_3$)(C$_3$H$_6$OC$_2$H$_3$—(OH)CH$_2$OH)—O] $_7$Si(CH$_3$)$_3$ a molecular weight 6,154, (d) equivalent weight 440, (e) is 15%, and (f) is 34%.

"Polysiloxane V" has a general formula:

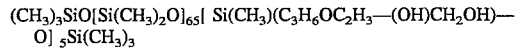
(CH$_3$)$_3$SiO[Si(CH$_3$)$_2$O]$_{65}$[ Si(CH$_3$)(C$_3$H$_6$OC$_2$H$_3$—(OH)CH$_2$OH)—O] $_5$Si(CH$_3$)$_3$ a molecular weight of 6068, (d) equivalent weight 607, (e) is 11, and (f) is 35%.

"Polysiloxane VI" has a general formula:

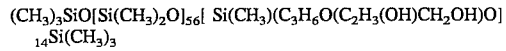
(CH$_3$)$_3$SiO[Si(CH$_3$)$_2$O]$_{56}$[ Si(CH$_3$)(C$_3$H$_6$O(C$_2$H$_3$(OH)CH$_2$OH)O] $_{14}$Si(CH$_3$)$_3$ a molecular weight of 6980, (d) equivalent weight 249, (e) is 26%, and (f) is 28%.

"Polysiloxane VII" has a general formula

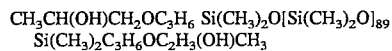
CH$_3$CH(OH)CH$_2$OC$_3$H$_6$ Si(CH$_3$)$_2$O[Si(CH$_3$)$_2$O]$_{89}$Si(CH$_3$)$_2$C$_3$H$_6$OC$_2$H$_3$(OH)CH$_3$ a molecular weight of 6962, (d) an equivalent weight of 3481, (e) is 3.7%, and (f) is 39%.

"Polysiloxane VIII" has a general formula:

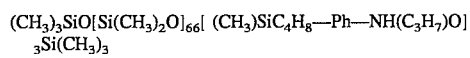
(CH$_3$)$_3$SiO[Si(CH$_3$)$_2$O]$_{66}$[ (CH$_3$)SiC$_4$H$_8$—Ph—NH(C$_3$H$_7$)O] $_3$Si(CH$_3$)$_3$ where Ph= phenylene, a molecular weight of 5782, and equivalent weight (d) of 3481, (e) is 9.9% and (f) is 37%.

"Polysiloxane IX" has a general formula:

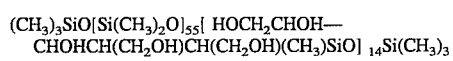
(CH$_3$)$_3$SiO[Si(CH$_3$)$_2$O]$_{55}$[ HOCH$_2$CHOH—CHOHCH(CH$_2$OH)CH(CH$_2$OH)(CH$_3$)SiO] $_{14}$Si(CH$_3$)$_3$ a molecular weight of 7550, an equivalent weight (d) of 108, (e) is 33% and (f) is 26%.

"Polysiloxane X" has a general formula:

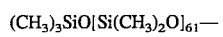
(CH$_3$)$_3$SiO[Si(CH$_3$)$_2$O]$_{61}$—

[(CH₃)Si(CH₃H₆OCH₂CH(OH)CH₂OH)O]₉—Si(CH₃)₃ a molecular weight of 6390, an equivalent weight (d) of 355, (e) is 19% and (f) is 32%.

The amidine and imidate compounds used as compatibilisers in the compositions of the invention are preferably capable of reacting with isocyanates, without the liberation of monomeric by-products. The preparation of these amidine and imidate compounds in both cyclic and acyclic forms is well known in the literature.

A general review of the preparation of imidates is given in "The Chemistry of Amidines and Imidates", Ed. S. Patai, chapter 9, "Imidates including cyclic imidates", D. G. Neilson, John Wiley, London 1975. This work includes references to the preparation of the analogous thiomidates.

The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in Heterocyclic Chemistry", Vol. 6 Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine or any isomer of propanediamine in the presence of an acid catalyst. Alternatively these materials can be prepared by the combination of ethylenediamine, etc., with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous 6 membered ring amidines—i.e. the tetrahydropyrimidines—can be achieved in a similar manner by the use of optionally substituted 1,3-propanediamine as the diamine component. Compounds such as diazabicyclononene (DBN) and diazabicycloundecene (DBU)—see the following formulae—are particularly effective as compatibilizers. These are available commercially.

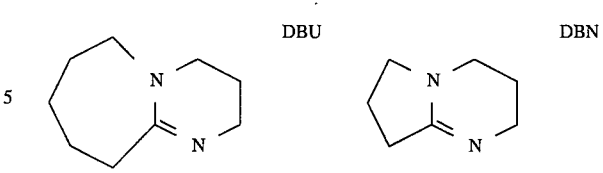

Specific methods are described in "The Chemistry of Heterocyclic Compounds: The Pyrimidines, Supplement I", Ed. A. Weissberger and E. C. Taylor, author D. J. Brown, Interscience Publishers, New York, 1953.

Examples of especially suitable oxazolines and dihydro-1,3-oxazines for use in the composition of the invention include reaction products of carboxylic acids such as ethanoic acid, propanoic acid, butanoic acid, pentanoic acid, hexanoic acid, heptanoic acid, octanic acid, decanoic acid, undecanoic acid, oleic acid, stearic acid, palmitic acid, malonic acid, 4-chlorobenzoic acid, 4-nitrobenzoic acid, 3-nitrobenzoic acid with ethanolamine, 2-aminopropan-1-ol, 2-aminobutan-1-ol, 1-aminopropan-2-ol, 1-aminobutan-2-ol, 3-aminopropan-1-ol, 3-aminobutan-1-ol, 4-aminobutan-2-ol. Examples of especially suitable imidazolines and tetrahydro-pyrimidines for use in the composition of the invention include reaction products of above outlined carboxylic acids with ethylene diamine, 1-2-propylenediamine, 1-2-butylenediamine, N-methylethylenediamine, N-ethylethylenediamine, N-isopropylethylenediamine, 1-3-propylenediamine, 1-3-butanediamine, N-methyl-1,2-propylenediamine, N-methyl-1,3-propylene diamine, N-ethyl-1,3-propylene diamine.

Typical amidine and imidate compounds of cyclic form are:

bis-oxazolines, bis-thiazolines, or bis-imidazolines derived from adiponitrile or adipic acid, etc. of following formula (2)

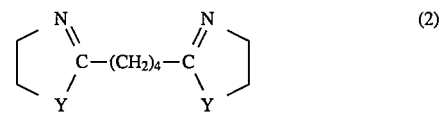

where Y is O, S, NH, N-R, or N-Ar; R is a monovalent aliphatic organic group of 1 to 10 carbons and Ar is an aromatic organic group of 6 to 18 carbons.

Mixtures of amidine and imidate compounds may be present in the composition, if desired. The mold release compositions of the invention typically contain from about 0.1 to about 40% preferably from about 1 to about 20% of metal salt polysiloxane blend on a weight basis.

In some instances concentrates containing up to 70% by weight of metal salt such as zinc stearate can be made when dissolved in DBU.

The mold release compositions may be conveniently prepared by agitating one or more metal salts and reactive polysiloxanes, as hereinbefore defined, with one or more amidine or imidate compounds at ambient or elevated temperatures until a solution or stable dispersion is obtained. In some cases, stirring for several hours at temperatures of up to 80°–90° C. or even higher may be necessary. Introduction of minor amounts of free fatty acid, such as oleic acid, acid precursors such as anhydrides or acid halides or epoxy compounds is sometimes useful for improving compatibility still further. In addition, compounds such as toluene sulfonic acid, xylene sulfonic acid, methane sulfonic acid, benzene sulfonyl chloride and phthalic anhydride are useful. The polysiloxane may optionally be added at a later stage.

As indicated above, the internal mould release compositions and blends of the invention are useful in the production of moulded articles by a process comprising reacting in a suitable mould a polyisocyanate composition with a isocyanate-reactive composition comprising one or more compounds containing a plurality of isocyanate-reactive groups in the presence of said mould release composition.

In order to facilitate the incorporation of the internal mould release composition of the invention into the reaction mixture used in the moulding process, it is usually desirable to pre-blend said composition into at least part of the isocyanate-reactive composition employed in the process.

Accordingly, in another aspect of the invention, there is provided an isocyanate-reactive composition comprising at least one compound having a plurality of isocyanate-reactive groups having dissolved or dispersed therein an effective amount of an internal mould release composition comprising:

(a) a metal salt of an organic acid, said metal salt having mould release properties, a polysiloxane polymer having isocyanate reactive organic groups, and (b) a compatibilising amount of an amidine or imidate compound of formula 1 or 2, the metal salt being incompatible with the compound having a plurality of isocyanate-reactive groups in the absence of the compatibiliser, under the conditions used for preparing and processing said isocyanate reactive composition.

Said isocyanate-reactive composition may be prepared by combining all the ingredients in a single operation (stirring and heating as necessary to provide complete compatibilisation) or, if desired, by pre-blending any two or more of the individual ingredients. It is often desirable to form such pre-blends or concentrates.

The expression "an effective amount" used herein means an amount of the mould release composition of the invention sufficient to provide improved mould release when the isocyanate-reactive composition is used in a moulding process. Where the isocyanate-reactive composition contains more than one isocyanate-reactive compound, the requirement of incompatibility with the metal salt means that the metal salt is incompatible with at least one of the isocyanate-reactive compounds present in the composition, under the conditions used for preparing and processing said composition.

Compounds containing a plurality of isocyanate-reactive groups which may be present in the isocyanate-reactive compositions of the invention include compounds having molecular weights of from about 18 to about 12,000, containing an average of two or more isocyanate-reactive groups per molecule, said compositions may include water. Examples of isocyanate-reactive groups which may be present in these compounds include hydroxyl (also water), thiol, primary amino, secondary amino, imino-functional and enamine groups, and mixtures of such groups. Particularly important isocyanate-reactive compositions for use in RIM processes contain a combination of a relatively high molecular weight polymer containing a plurality of isocyanate-reactive groups (usually referred to as a "softblock") and a relatively low molecular weight compound (including water) containing a plurality of isocyanate-reactive groups, usually known as a chain extender.

Thus, in a further aspect of the invention, there is provided an isocyanate-reactive composition comprising:

(i) at least one polymer containing a plurality of isocyanate-reactive groups and having a number average molecular weight of from 1500 to about 12000;

(ii) at least one chain extender having a molecular weight less than 1500, and (iii) an effective amount of an internal mould release composition comprising:

(a) a metal salt of an organic acid, said metal salt having mould release properties, a polysiloxane polymer having isocyanate reactive organic groups, and (b) a compatibilising amount of a amidine or imidate compound of formula 1 or 2, the metal salt being incompatible with the combination of (i) and (ii) in the absence of the compatibiliser, under the conditions used for preparing and/or processing said isocyanate reactive composition.

Polymers containing a plurality of isocyanate-reactive groups which may be present in the isocyanate-reactive compositions of the invention include polyols, polyamines, imino-functional polymers, enamine containing polymers and mixtures thereof.

Polymeric polyols having molecular weights in the range from 1500 to about 12000 are well known as polyurethane components and may be prepared by methods fully described in the prior art. As examples of suitable polyols there may be mentioned polythioethers, polyesters, polyesteramides, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water, polyols, for example ethylene glycol, propylene glycol, diethylene glycol, resorcinol, bisphenol A, glycerol, trimethylolpropane, 1,2,6-hexanetriol, triethanolamine, pentaerythritol, sorbitol or sucrose, ammonia, primary monoamines, for example aniline or benzylamine, polyamines, for example ethylene diamine, hexamethylene diamine, toluene diamines, diaminodiphenylmethanes and polymethylene polyphenylene polyamines obtained by the condensation of aniline and formaldehyde, and aminoalcohols, for example ethanolamine and diethanolamine. Mixtures of initiators and/or cyclic oxides may be used.

Especially useful polyether polyols include polyoxypropylene and poly(oxyethylene-oxypropylene) diols and triols obtained by the simultaneous or sequential addition of ethylene and propylene oxides to appropriate di- or trifunctional initiators as fully described in the prior art. Mixtures of the said diols and triols are often particularly useful.

Because of their enhanced reactivity, ethylene oxide tipped polyols are often preferred.

Polyester polyols which may be used include hydroxyl terminated reaction products of polyhydric alcohols such as ethylene glycol, propylene glycol, diethylene glycol, 1,4-butanediol, polyether polyols, bis(hydroxyethyl) terephthalate, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate. Polyesters obtained by the polymerisation of lactones, for example caprolactone, in conjunction with a polyol, may also be used. Polyesteramides may be obtained by the inclusion of aminoalcohols such as ethanolamine in polyesterification mixtures. Polythioether polyols which may be used include products obtained by condensing thiodiglycol (either alone or with other glycols), with dicarboxylic acids, formaldehyde, alkylene oxides, aminocarboxylic acids, or combinations thereof. Polycarbonate polyols which may be used include products obtained by reacting diols such as 1,3-propanediol, 1,4-butanediol, 1,6-hexanediol, diethylene glycol or tetraethylene glycol with diaryl carbonates, (for example diphenyl carbonate), with cyclic carbonates (i.e. ethylene carbonate), or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated homo- and copolymers and suitable polysiloxane polyols include polydimethylsiloxane diols and triols, wherein the hydroxyl groups are organically bound.

Polymeric polyamines having molecular weights in the range from 1500 to about 12000 are well known as components of polyurea forming reaction mixtures and may be prepared by methods fully described in the prior art. As examples of suitable polyamines, there may be mentioned amino-terminated polythioethers, polyesters, polyesteramides, polycarbonates, polyacetals, polyolefins, polysiloxane and, especially, polyethers obtained by replacing the hydroxy groups of the corresponding polyols partially or completely by secondary or preferably primary amino groups. The preferred polymeric polyamines are polyether diamines and triamines, especially polyoxypropylene diamines and triamines.

Imino-functional polymers having molecular weights in the range from 1500 to about 12000 have been described in U.S. Pat. No. 4,794,129 together with methods for their preparation.

The preferred imino-functional polymers are imine-terminated polyethers such as may be obtained for example by reacting an aldehyde or ketone with a polyether polyamine, especially a polyoxypropylene diamine or triamine.

Enamine functional polymers having a molecular weight in the range of from 1500–12000 may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the H$_2$O formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidizing a primary hydroxy functional resin to the corresponding polycarboxylic acid, conversion of the said groups to orthoesters, and treatment of the latter, with an excess of a secondary amine. Each orthoester must contain at least one alpha hydrogen atom.

Polymers containing a plurality of isocyanate-reactive groups for inclusion in the isocyanate-reactive compositions of the invention preferably have molecular weights in the range from 2000 to 8000 and have isocyanate-reactive functionalities of from 2 to 4, especially 2 or 3. Aliphatic polyether based polymers (with multiple isocyanate-reactive groups) are preferred.

Chain extenders having molecular weights below 1500 which may be present in the isocyanate-reactive compositions of the invention have been fully described in the prior art and include polyols, polyamines, imines, enamines, especially diols and diamines. Mixtures of different chain extenders may be used if desired. Preferred chain extenders have molecular weights below 800 and often below 500.

Polyols which may be used as chain extenders include ethylene glycol and 1,4-butanediol. Polyamines which may be used as chain extenders include aliphatic polyamines, especially diamines, and aromatic polyamines, especially sterically hindered diamines.

Ethylene diamine and low molecular weight polyether diamines are examples of suitable aliphatic polyamines whilst suitable aromatic diamines include 3,5-diethyl-2,4-toluene diamine, 3,5-diethyl-2,6-toluene diamine and mixtures thereof, (referred to as DETDA) 4,4'- and 2,4'-diaminodiphenylmethanes and mixtures thereof, 2,4- and 2,6-diaminotoluenes and mixtures thereof, 1,3,5-triisopropyl-2, 4-diaminobenzene, 1,3,5-triethyl-2,4-diamino benzene 3,3',5 5'-tetraisopropyl-4,4'-diaminodiphenylmethane and the like.

Other chain extenders which may be used include iminofunctional compounds as described in U.S. Pat. No. 4,794, 129, and enamines.

The relative proportions of isocyanate-reactive polymer and chain extender present in the isocyanate-reactive compositions of the invention generally conform to the teachings of the prior art. The concentration of internal mould release composition in the isocyanate-reactive composition is typically such that the latter contains from about 0.1 to about 10% by weight of metal salt, preferably from about 0.5% to about 5%. If desired, however, a more concentrated solution or dispersion of internal mould release composition in one or more compounds containing a plurality of isocyanate-reactive groups may be prepared to act as a masterbatch to be mixed with further isocyanate-reactive compound before being used in the moulding process.

The ratio (by wt.) of polysiloxane to metal salt is between about 1:9 and 9:1; preferably 1:4 to 4:1; more preferably 1:2 to 2:1; and most preferably 1:1.5 to 1.5:1.

The moulding process comprises reacting a polyisocyanate composition with an isocyanate-reactive composition of the invention in a suitable mould.

Accordingly, in a still further aspect of the invention, there is provided a reaction system for use in making a moulded article, said system comprising the following components:

(1) a polyisocyanate composition, and
(2) an isocyanate-reactive composition comprising at least one compound having a plurality of isocyanate-reactive groups having dissolved or dispersed therein an effective amount of an internal mould release composition comprising:
 (a) a metal salt of an organic acid, said metal salt having mould release properties, a polysiloxane polymer having isocyanate reactive organic groups, and
 (b) a compatibilising amount of an amidine or imidate compound of formula 1 or 2, the metal salt being incompatible with the compound having a plurality of isocyanate-reactive groups in the absence of the compatibiliser, under the conditions used for preparing and/or processing said isocyanate reactive composition.

The invention also provides a reaction system for use in making a reaction injection moulded article, said system comprising the following components:

(1) a polyisocyanate composition, and
(2) an isocyanate-reactive composition comprising:
 (i) at least one polymer containing a plurality of isocyanate-reactive groups and having a number average molecular weight of from 1500 to about 12000;
 (ii) at least one chain extender having a molecular weight less than 1500 which may include water, and
 (iii) an effective amount of an internal mould release composition comprising:

(a) a metal salt of an organic acid, said metal salt having mould release properties, a polysiloxane polymer having isocyanate reactive organic groups, and (b) a compatibilising amount of an amidine or imidate compound of formula 1 or 2, the metal salt being incompatible with the combination of (i) and (ii) in the absence of the compatibiliser, under the conditions used for preparing and/or processing said isocyanate reactive composition.

Polyisocyanate compositions which may be reacted with the isocyanate-reactive compositions of the invention in the moulding process may include any of the aliphatic, cycloaliphatic, araliphatic or aromatic polyisocyanates known in polyurethane or polurea chemistry, especially those that are liquid at room temperature.

Examples of suitable polyisocyanates include 1,6-hexamethylene diisocyanate, isophorone diisocyanate, cyclohexane-1,4-diisocyanate, 4,4'-dicyclo-hexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenylene polyisocyanates (crude MDI) and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

In general, the aromatic polyisocyanates are preferred, especially the available MDI isomers, that is to say 4,4'-diphenylmethane diisocyanate, 2,4'-diphenylmethane diisocyanate and mixtures thereof. MDI variants such as uretonimine-modified MDI and MDI prepolymers are also of great value in the moulding process. The reaction systems of the invention may also contain other conventional ingredients of such systems, said ingredients usually being present in the isocyanate-reactive compositions of the invention. Such ingredients include catalysts, for example tin compounds and tertiary amines; surface-active agents and foam stabilisers, for example siloxane-oxyalkylene copolymers, blowing agents, for example water and low boiling halogenated hydrocarbons, flame retardants, plasticisers, dyes, fillers and reinforcing agents.

In the moulding process, the techniques and equipment used may be those that have been fully described in the prior art. RIM processes which may be used include structural (including mat-reinforced) RIM, amine extended RIM processes and "spray" RIM processes.

The invention is illustrated but not limited by the following Examples wherein all proportions are on a parts by weight basis unless otherwise stated.

EXAMPLE 1

A mold release composition is prepared by mixing at 80° C. and then cooling, a mixture of (a) 20 g of an imidazoline containing compound commercialised by Lakeland Laboratories Ltd. under the trade mark IMIDAZOLINE 18 OH and having the structure

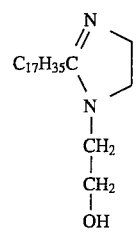

10 g of Zinc Stearate and 10 g of "Polysiloxane I".

A stable isocyanate reactive composition suitable for RIM processes is obtained by mixing at 80° C. and then cooling to room temperature (b) 4 g of the above described internal mould release composition of (a) with 80 g of a high molecular weight ethylene oxide tipped triol, having an hydroxyl value of 28 mg KOH/g, commercialized by ICI under the trade mark DALTOCEL F2805 and 20 g of DETDA (diethyltoluene diamine).

EXAMPLE 2

An internal mould release composition is prepared by mixing at 80° C. and then cooling, a mixture of (a) 20 g of an imidazoline containing compound commercialised by Lakeland Laboratories Ltd. under the trademark IMIDAZOLINE 18DA and having the structure

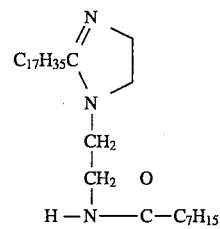

with 5 g of Zinc Stearate and 5 g of "Poly siloxane V".

An isocyanate reactive composition suitable for RIM-processes can be obtained by mixing at 80° C. and then cooling to 45° C.

(b) 6 g of the above described internal mould release composition (a) with 80 g of DALTOCEL F2805 and 20 g of DETDA

EXAMPLE 3

An isocyanate reactive composition containing a mould release agent suitable for RIM-processes is obtained by mixing at 110° C. and cooling to room temperature, a mixture of 1 g of Zinc Stearate and
1 g of "Polysiloxane IX"
80 g DALTOCEL F2805
20 g DETDA
3 g methyloxazoline

EXAMPLE 4

A portion consisting of 66% by weight zinc stearate dissolved in DBU (34%) was prepared by conventional mixing for a period of 40 minutes at a temperature of 90° C. To this blend a hydroxy functional silicone "DC1248" (available commercially from DOW-Corning Corporation) was added. The following B component formulation was prepared by mixing this composition with the other ingredients at ambient temperature:

| B-component | |
|---|---|
| DETDA | 21.88 |
| Polyimine A | 56.62 |
| Polyamine A | 18.87 |
| Oleic Acid | 0.65 |
| DBU | 0.5 |
| Zinc Stearate | 1.0 |
| DC1248 Polysiloxane | 2.67 |
| Surfactant L-5430 (Union Carbide) | 0.5 |

"Polyamine A" is a glycerol initiated 5000 molecular weight primary amine terminated polyoxypropylene triamine, (Texaco; Jeffamine T-5000).

"Polyimine A" is a cyclohexanone reaction product of "Polyamine A" wherein 80% of the terminal amine groups have been converted to cyclohexanone imine groups.

This B component blend was reacted with an isocyanate A component prepolymer. The prepolymer is made by reacting:

| | |
|---|---|
| 48.36 pbw | MDI (80% 4,4'-MDI, 20% 2,4'MDI), |
| 12.09 pbw | Uretonimine Modified 4,4'-MDI[2], |
| 28.60 pbw | Primary Amine Terminated Polyoxypropylene Diamine[3], and |
| 10.95 pbw | Tri-functional Polyether Polyol[4]. |

The resultant prepolymer had an NCO value of 17.34%.

The A and B components were mixed and reacted in a reaction injection molding machine. The isocyanate index (A/B) was 1.1, the component temperature was 48° C., the mold temperature was 68°–72° C., and the demold time was 30 seconds. The mold had been treated once, prior to the run, with a water based external mold release[6], over a basecoat of wax[7].

The mold preparation was done by stripping the mold using N-methylpyrrolidinone. Mineral spirits were then applied to the mold surface. These solvents were then wiped off with a dry towel, for a bare metal surface. A wax basecoat was then applied by hand and subsequently wiped with a dry towel. After this basecoat was applied, the soap external mold release was sprayed evenly over the mold once. This procedure was done prior to the run.

21 Firebird rear fascias were manufactured wherein the last part released as quickly as the first. The trial was stopped voluntarily; not because of release failure.

2 Commercially available as LF-168 from ICI

3 Commercially available as JEFFAMINE D2000 from Texaco

4 Commercially available as LHT-42 from Union Carbide

5 Commercially available as RIMLine 9031A from ICI

6 Commercially available as RCTW-2006 from Chem-Trend

7 Commercially available as RCT-2007 from Chem-Trend

The procedure and formulation of Example 4 was repeated without the silicone release additive. Nine releases were obtained before the part required additional force to remove. A similar experiment without zinc stearate and with an increased amount of DC 1248 (3.94 pbw) showed an unacceptable number of releases.

It is thus seen that the formulation of the invention achieves acceptable release performance with a desirable (i.e., low) level of zinc stearate. The same level of zinc stearate alone does not give an acceptable number of releases. Similarly, even very high levels of the reactive silicone fail to give acceptable release performance, when used alone.

It is therefore shown that a useful synergy exists between the reative polysiloxane and the fatty acid metal salt. The combination is more effective than the individual ingredients with respect to the practical needs of the process.

I claim:

1. An internal mould release composition comprising:
   (a) a mould release composition comprising:
      i) a metal salt of an carboxylic acid having 10–24 carbon atoms, said metal being selected from Groups IA, IB, IIA and IIB of the Periodic Table or chromium, molybdenum, iron, cobalt, nickel, aluminum, tin, lead, bismuth, antimony, and zinc, and
      ii) a polysiloxane polymer having organic groups which are reactive with isocyanate organic groups, and
   (b) a compatibilising amount sufficient to provide improved stability of the metallic salt mould release agent and improved control over reactivity of the isocyanate reactive ingredients of an amidine or imidate compound of formula (1)

$$R^4-X-\underset{\underset{R^2}{|}}{C}=N-R^3 \quad (1)$$

wherein X represents O, S or NR[1] and wherein each of R[1] to R[4] represents H or, independently or together, an organic radical, selected from:
   i) alkyl radicals,
   ii) cyclo alkyl radicals,
   iii) aralkyl radicals or aryl radicals, or
   iv) polymeric chains containing hetero atoms, wherein the polymeric chains are selected from polyether chains, polyester chains, polycarbonate chains or polyacetal chains.

2. The composition according to claim 1, wherein said polysiloxane polymer comprises 0.5–20 mol percent of $R_aR'_bSiO_{[4-(a+b)]/2}$ units and 80–99.5 mol percent of $R''_cSiO_{(4-c)/2}$ units where R is an isocyanate reactive organic radical, (a) has an average value of from 1–3, R' and R" are both nonisocyanate reactive organic radicals, (b) has an average value of 0–2, a+b is from 1–3, and (c) has an average value of from 1–3, wherein the ratio of the total molecular weight of said polysiloxane mold release agent to the total number of isocyanate reactive functional groups in said polysiloxane mold release agent ranges from 100–3500, the combined formula weights of all isocyanate reactive organic radicals, R, do not exceed 40% of the total molecular weight of said polysiloxane mold release agent, the combined formula weights of all non-isocyanate reactive radicals, R'+R", together do not exceed 40% of the total molecular weight of said polysiloxane mold release additive, the combined formula weights of all the organic radicals, R+R'+R", in the molecule together do not exceed 60% of the total molecular weight of the molecule, said polysiloxane mold release agent contains an average of at least two isocyanate-reactive functional groups per molecule, at least two of the isocyanate reactive functional groups in each molecule are located on separate organic radicals, R, attached independently to different silicon atoms in said polysiloxane, said isocyanate reactive functional groups (R) are selected from the group consisting of alcohols, phenols, thiols, primary or secondary amines, imines, enamines, and ketene aminals;

and said polysiloxane mold release agent being substantially insoluble in liquid organic isocyanates.

3. The composition according to claim 1, wherein said polysiloxane has a molecular weight of 4000–8000 and a viscosity of 1–100,000 mm²/s.

4. The composition according to claim 2, wherein R is selected from the group consisting of R'''—OH, R'''—CHOHCH$_2$OH, R'''—CHOHCH$_3$, R'''—SH R'''—CH$_2$SH;

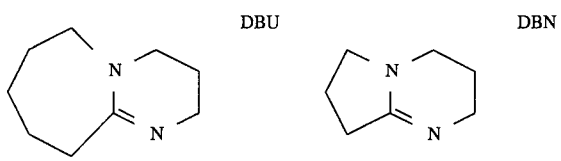

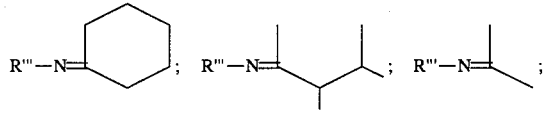

is a divalent linking group composed of carbon and hydrogen; carbon, hydrogen and oxygen; carbon, hydrogen and sulfur; or carbon, hydrogen, oxygen and sulfur.

5. The composition according to claim 1 wherein the compound of Formula (1) is selected from diazabicycloundecene and diazabicyclononene, which have the following structures:

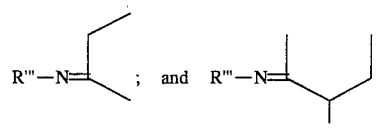

6. The composition according to claim 1, wherein the metal salt is zinc stearate.

* * * * *